Nov. 24, 1953  M. D. BRANE ET AL  2,660,126
EMERGENCY DYNAMIC BRAKING SYSTEM
Filed Dec. 30, 1949  3 Sheets-Sheet 3

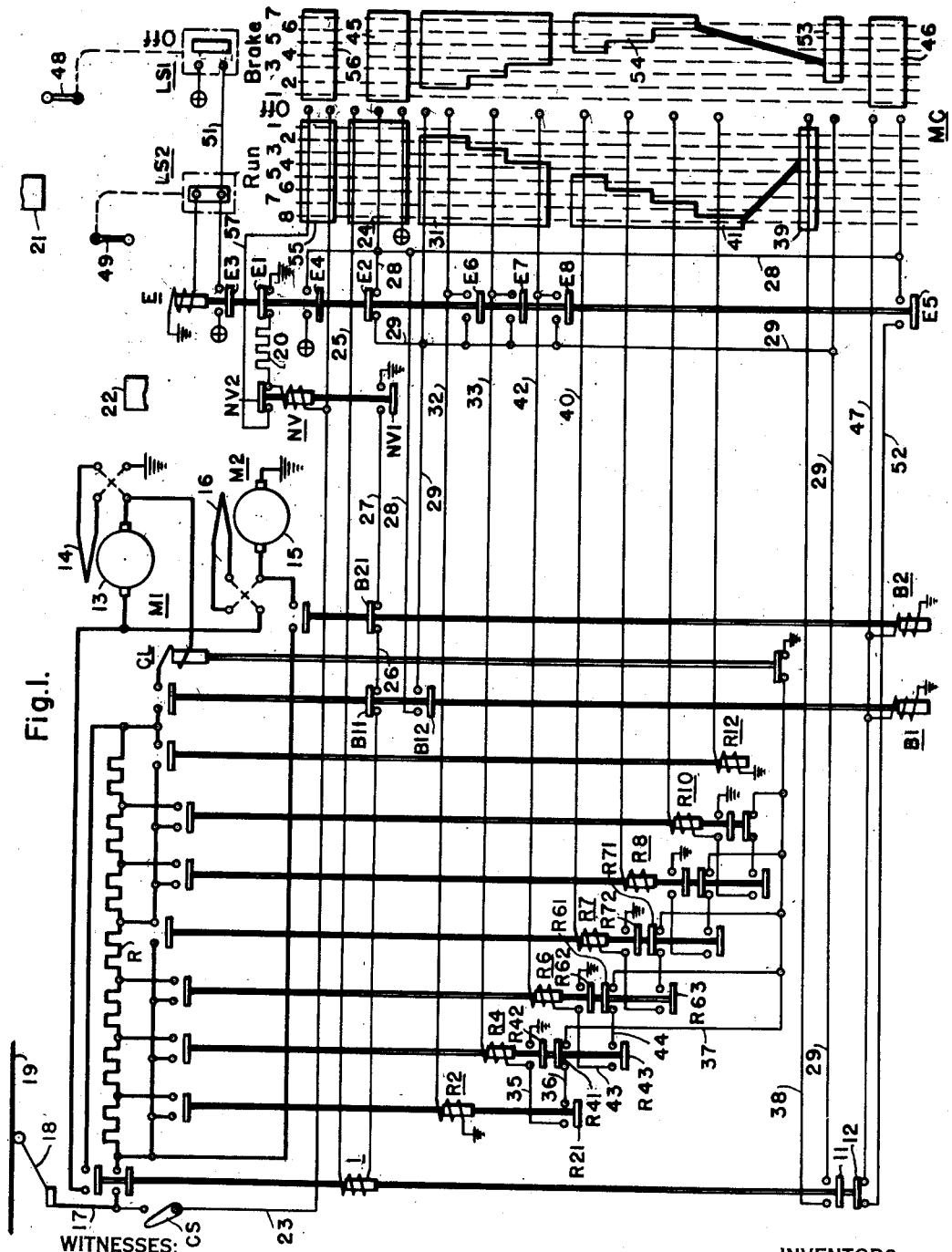

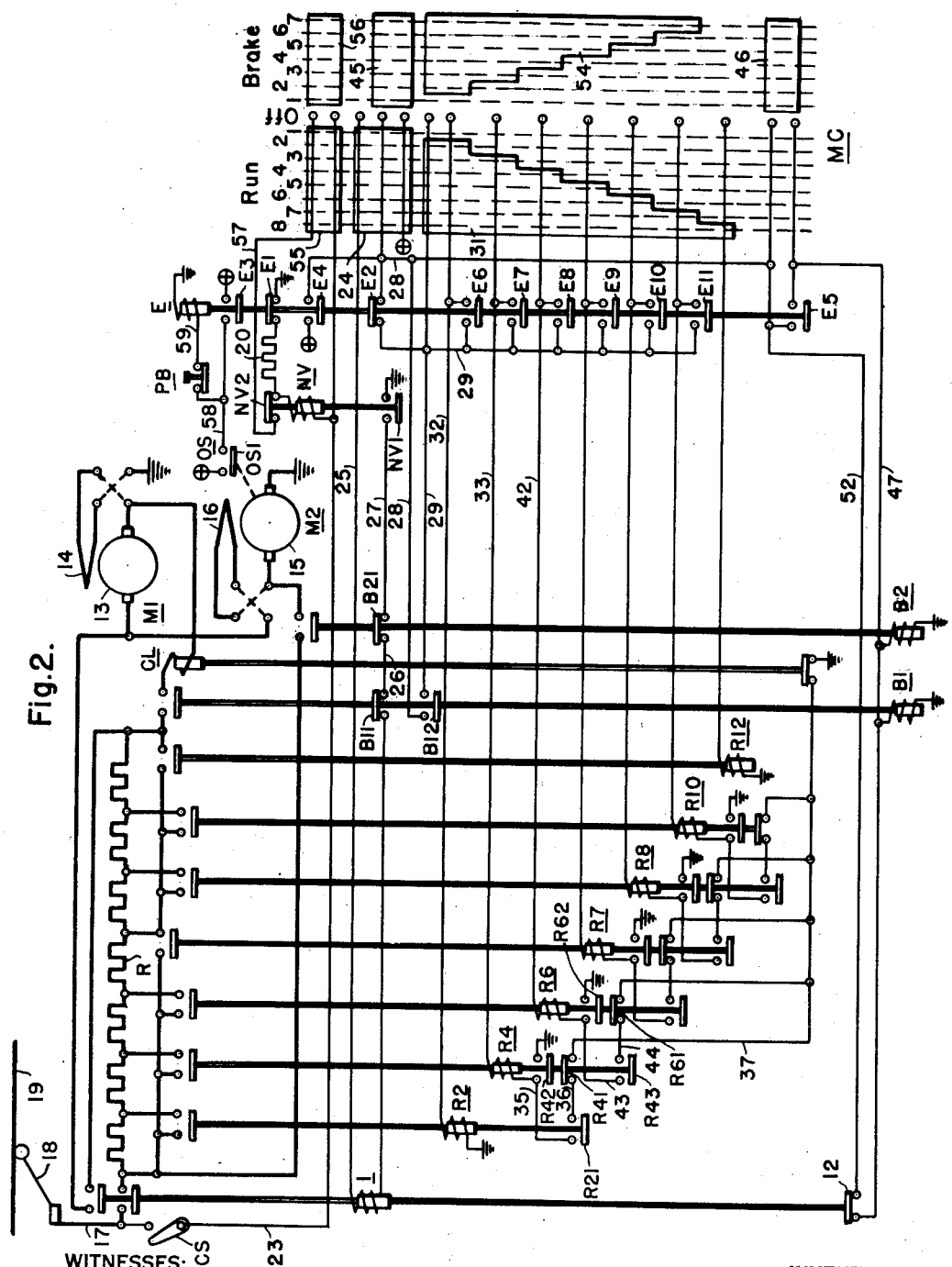

Fig. 3.

| Controller Notch | | Normal Run-Braking Sequence | | | | | | | | | |
|---|---|---|---|---|---|---|---|---|---|---|---|
| | | I | R2 | R4 | R6 | R7 | R8 | R10 | R12 | B1 | B2 |
| Run | 1 | O | | | | | | | | | |
| | 2 | O | O | | | | | | | | |
| | 3 | O | O | O | | | | | | | |
| | 4 | O | O | O | O | | | | | | |
| | 5 | O | O | O | O | O | | | | | |
| | 6 | O | O | O | O | O | O | | | | |
| | 7 | O | O | O | O | O | O | O | | | |
| | 8 | O | O | O | O | O | O | O | O | | |
| Brake | 1 | | | | | | | | | O | O |
| | 2 | | O | | | | | | | O | O |
| | 3 | | O | O | | | | | | O | O |
| | 4 | | O | O | O | | | | | O | O |
| | 5 | | O | O | O | O | | | | O | O |
| | 6 | | O | O | O | O | O | | | O | O |
| | 7 | | O | O | O | O | O | O | | O | O |

Fig. 4.

| Step | | Preset Braking Sequence | | | | | | | | | | |
|---|---|---|---|---|---|---|---|---|---|---|---|---|
| | | I | R2 | R4 | R6 | R7 | R8 | R10 | R12 | B1 | B2 | |
| Brake | 1-4 | | O | O | O | | | | | O | O | Preset by LS1 |
| | 5 | | O | O | O | O | | | | O | O | Under Control |
| | 6 | | O | O | O | O | O | | | O | O | of Operator |
| | 7 | | O | O | O | O | O | O | | O | O | |

Fig. 5.

| | | Overspeed Braking Sequence | | | | | | | | | |
|---|---|---|---|---|---|---|---|---|---|---|---|
| | | I | R2 | R4 | R6 | R7 | R8 | R10 | R12 | B1 | B2 |
| O.S. Relay Operates | | | | | | | | | | O | O |
| | | | O | | | | | | | O | O |
| | | | O | O | | | | | | O | O |
| | | | O | O | O | | | | | O | O |
| | | | O | O | O | O | | | | O | O |
| | | | O | O | O | O | O | | | O | O |
| | | | O | O | O | O | O | O | | O | O |

Fig. 6.

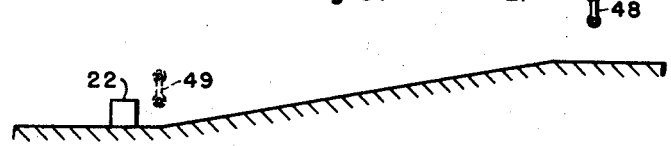

WITNESSES:

INVENTORS
Maxwell D. Brane and
Allen McLanahan.
BY
ATTORNEY

Patented Nov. 24, 1953

2,660,126

UNITED STATES PATENT OFFICE 2,660,126

EMERGENCY DYNAMIC BRAKING SYSTEM

Maxwell D. Brane, Wexford, and Allen McLanahan, Pittsburgh, Pa., assignors to Westinghouse Electric Corporation, East Pittsburgh, Pa., a corporation of Pennsylvania Application December 30, 1949, Serial No. 135,978

6 Claims. (Cl. 104—149)

Our invention relates, generally, to dynamic braking systems and, more particularly, to systems for establishing dynamic braking under emergency conditions.

In the interest of safety there is need for protective features to be installed on electric vehicles, such as mining locomotives, to limit locomotive speed to a safe value in order to decrease the number of derailments and wrecks.

An object of our invention is to provide for automatically taking the control of a locomotive away from the operator and applying dynamic braking under predetermined conditions.

Another object of our invention is to provide for automatically limiting the speed of a locomotive by applying dynamic braking under the control of a current limit relay when it is operating on certain sections of track as, for example, down grades or around curves.

A further object of our invention, is to provide for automatically limiting the maximum speed of a locomotive by applying dynamic braking under the control of a current limit relay which prevents locking the wheels by the dynamic brake under usual track conditions.

Still another object of our invention is to require the operator to perform certain definite operations before power can be reapplied to a locomotive after dynamic braking has been automatically applied.

A more general object of our invention is to provide an emergency dynamic braking system which shall be simple and efficient in operation and which may be economically manufactured and installed.

A still further object of our invention is to provide an emergency dynamic braking system which may be readily installed on existing locomotives.

Other objects of our invention will be explained fully hereinafter or will be apparent to those skilled in the art.

In accordance with our invention, a locomotive is provided with safety devices which are automatically actuated under predetermined conditions to take the control of the locomotive away from the operator, disconnect the traction motors from the power supply and apply dynamic braking under the control of a current limit relay to slow the locomotive down to a safe speed. The operator must return the master controller handle to the "off" position before power can be reapplied to the motors.

For a better understanding of the nature and objects of our invention, reference may be had to the following detailed description, taken in conjunction with the accompanying drawings, in which:

Figure 1 is a diagrammatic view of a control system embodying the principal features of our invention;

Fig. 2 is a diagrammatic view of a modification of the invention;

Fig. 3 is a chart showing the normal sequence of operation of the control apparatus illustrated in Figs. 1 and 2.

Fig. 4 is a chart showing the sequence of operation of the control apparatus in Fig. 1 under preset braking conditions;

Fig. 5 is a chart showing the sequence of operation of the control apparatus in Fig. 2 when the locomotive exceeds a predetermined speed, and Fig. 6 is a diagrammatic view illustrating the method of presetting the control apparatus when the locomotive is descending a grade.

Referring to the drawings, and particularly to Figure 1, the system shown therein comprises traction motors M1 and M2 which may be of a type suitable for propelling an electric locomotive (not shown). The motor M1 has an armature winding 13 and a series field winding 14. Likewise, the motor M2 has an armature winding 15 and a series field winding 16.

The power for operating the motors M1 and M2 may be supplied through a power conductor 17 which is connected to a current collecting device 18 which, in turn, engages a trolley conductor 19. The conductor 19 may be energized from any suitable source, such as a power generating station (not shown).

A resistor R is provided for limiting the motor current during both acceleration and dynamic braking of the locomotive. One terminal of the resistor R is connected to the power conductor 17 through one set of contact members of a switch 1. The other terminal of the resistor R is connected to the motors M1 and M2 through another set of contact members of the switch 1. The resistor R may be shunted from the motor circuit step-by-step by means of resistor shunting switches R2, R4, R6, R7, R8, R10 and R12 in a manner well known in the art.

A dynamic braking circuit for the motors M1 and M2 may be established through switches B1 and B2. The dynamic braking circuit is of a well-known type in which the armature winding 13 of the motor M1 is connected across the field winding 16 of the motor M2 and the armature winding 15 of the motor M2 is connected across the field winding 14 of the motor M1.

The operation of the line switch 1 and the resistor shunting switches is controlled during acceleration by means of a master controller MC. Under normal conditions the operation of the dynamic braking switches B1 and B2 and the resistor shunting switches is controlled by the controller MC.

A current-limit relay CL is provided for controlling the progression of the resistor shunting switches to limit the dynamic braking current to a predetermined amount. The contact members of the current-limit relay CL are so connected in the control circuit that the progression of the resistor shunting switches is stopped when the motor current exceeds the setting of the limit relay.

In order to limit the locomotive speed on grades or around curves provision is made for automatically establishing dynamic braking independently of the position of the controller MC by means of an emergency relay E and limit switches LS1 and LS2 which are actuated by actuating devices 21 and 22, respectively, disposed at predetermined locations along the track over which the locomotive operates. The switch LS1 may be of a type which is normally biased to its "off" position and is actuated to its closed position by the device 21 as the locomotive passes this device which may be located at the top of a grade.

When the locomotive passes the device 22 which may be located at the bottom of the grade, the switch LS2 is actuated from its closed position to an open position. It will be understood that the switches LS1 and LS2 return to the positions shown in the drawing when released by the actuating devices 21 and 22.

The emergency relay E, the operation of which is controlled by the switches LS1 and LS2, is provided with contact members which effect the closing of the dynamic braking switches B1 and B2 and also cause certain of the resistor shunting switches to be closed under the control of the limit relay CL to limit the speed of the locomotive while the relay E is closed, as will be subsequently described. During this time the operator of the locomotive can further reduce the speed if he so desires by operating the controller to close additional resistor shunting switches, but he can not exceed the predetermined speed.

In order to require the operator to return the controller MC to the "off" position before reapplying power to the motors after the operation of the emergency relay E, a no-voltage relay NV is provided. The actuating coil of the relay NV is energized by the potential of the power conductor 17 and the contact members of the relay are so connected in the control system that the controller MC must be returned to the "off" position before the switch 1 can be reclosed to apply power to the locomotive after the operation of the relay E, as will be subsequently described.

In order that the functioning of the foregoing apparatus may be more clearly understood, the operation of the system will now be described in more detail. Assuming that it is desired to apply power to the motors M1 and M2 to accelerate the locomotive, a switch CS is closed and the controller MC is actuated through the running positions step-by-step.

When the switch CS is closed the actuating coil of the no-voltage relay NV is energized through a circuit which extends from the power conductor 17 through the switch CS, conductor 23, the coil of the relay NV, a resistor 20 and contact members E1 to ground. When the controller MC is on position 1 the actuating coil of the switch 1 is energized through a circuit which may be traced from positive through a segment 24 on the controller MC, conductor 25, the coil of the switch 1, interlock B11, conductor 26, an interlock B21, conductor 27, and contact members NV1 to ground.

As explained hereinbefore the closing of the switch 1 connects the motors M1 and M2 to the power source through the resistor R. The switches R2, R4, R6, R7, R8, R10 and R12 may be closed in sequential relation by actuating the controller MC through positions 2 to 8, thereby shunting the resistor R from the motor circuit. The energizing circuit for the switch R2 may be traced from positive through the contact segment 24, conductor 28, contact members E2, conductor 29, a segment 31 on the controller MC, conductor 32 and the coil of the switch R2 to ground. The energizing circuit for the switch R4 extends from the segment 31 through conductor 33, the coil of the switch R4, conductor 35, an interlock R21, conductor 36, an interlock R41, conductor 37, and the contact members of the current-limit relay CL to ground. A holding circuit for the switch R4 is established through an interlock R42 upon the closing of the switch.

The switch R6 is closed when the controller MC is on position 4. The energizing circuit for the switch R6 extends from the contact segment 31 on the controller MC through conductor 42, the actuating coil of the switch R6, conductor 43, an interlock R43, conductor 44, an interlock R61, conductor 37 and the contact members of the current-limit relay CL to ground. A holding circuit for the switch R6 is established through an interlock R62 upon the closing of the switch.

The switch R7 is closed when the controller MC is on position 5. The energizing circuit for the switch R7 extends from the conductor 29 through an interlock 11 on the switch 1, conductor 38, contact segments 39 and 41 on the controller MC, conductor 40, the actuating coil of the switch R7, interlocks R63 and R71, conductor 37 and the contact members of the current-limit relay CL to ground. A holding circuit for the switch R7 is established through an interlock R72. The switches R8, R10 and R12 are closed in a similar manner when the controller MC is actuated through positions 6 to 8.

Dynamic braking may be applied in the usual manner by returning the controller MC to the "off" position to open the switch 1 and the resistor shunting switches and then actuating the controller to one of the braking positions to close the switches B1 and B2. The energizing circuit for the switch B1 may be traced from positive through a segment 45 on the controller MC, conductor 28, a segment 46, conductor 47, and the coil of the switch B1 to ground. The energizing circuit for the switch B2 extends from the conductor 47 through the coil of the switch B2 to ground.

The switches R2, R4, R6, R7, R8 and R10 may be closed in sequential relation under the control of the current-limit relay CL by actuating the controller MC through the braking positions 2 to 7. Thus, the speed of the locomotive may be controlled by the operator in the usual manner.

In order to limit the speed of the locomotive when descending a grade or going around a curve, provision is made for automatically disconnecting the motors from the power source and establishing the dynamic braking circuits for the motors. When the locomotive passes the actuating device 21 which, as illustrated in Figure 6, may be located at the top of a grade, a handle 48 on the switch LS1 is engaged by the device 21 to actuate the switch LS1 to its closed position, thereby energizing the coil of the emergency relay E. The circuit for the coil of the relay E may be traced from positive through the switch LS1, conductor 51, the switch LS2 and the coil of the relay E to ground. A holding circuit for the relay E is established through an interlock E3 and the switch LS2. As explained hereinbefore, the switch LS1 returns to the "off" position when the handle 48 is disengaged from the actuating member 21.

The operation of the relay E interrupts the energizing circuit for the no-voltage relay NV, thereby causing this relay to drop to its lowermost position which interrupts the circuit through its contact members NV1 for the line switch 1 which opens to disconnect the motors from the power source. The opening of the contact members E2 on the relay E interrupts the energizing circuit for the resistor shunting switches.

Following the opening of the line switch 1 the switches B1 and B2 are closed to establish the dynamic braking circuits for the motors. The energizing circuit for the switches B1 and B2 may be traced from positive through contact members E4, conductor 28, contact members E5, conductor 52, an interlock 12 on switch 1 and conductor 47 to the coils of the switches B1 and B2.

Following the closing of the switch B1 the resistor shunting switch R2 is closed. The energizing circuit for the switch R2 extends from the conductor 28 through an interlock B12, conductor 29, contact members E6 and conductor 32 to the coil of the switch R2.

Following the closing of the switch R2 the switch R4 is closed. The energizing circuit for the switch R4 extends from the conductor 29 through contact members E7 and conductor 33 to the coil of the switch R4. The switch R6 is closed after R4 is closed. The energizing circuit for R6 extends from conductor 29 through contact members E8 and conductor 42 to the coil of the switch R6.

In this manner the dynamic braking circuits are established and the resistor shunting switches R2, R4 and R6 are closed independently of the position of the master controller MC and, therefore, independently of the operator of the locomotive. If the operator so desires, he may limit the speed of the locomotive still further by actuating the controller MC to the braking position 5, thereby closing the resistor shunting switch R7. The energizing circuit for the switch R7 extends from the conductor 29 through segments 53 and 54 on the controller MC and conductor 40 to the coil of the switch R7.

Following the closing of the switch R7, the switches R8 and R10 are closed in sequential relation, as indicated in the sequence chart in Figure 4. As explained hereinbefore, the operation of the resistor shunting switches during dynamic braking is under the control of the current-limit relay CL in a manner well known in the art.

When the locomotive passes the actuating device 22 which, as shown in Figure 6, is located at the bottom of the grade, a handle 49 is engaged by the device 22, thereby actuating the limit switch LS2 to its open position which interrupts the holding circuit for the emergency relay E, thereby causing this relay to drop to its lowermost position.

The deenergization of the relay E causes the switches B1 and B2 to be opened to disconnect the dynamic braking circuits. However, power can not be reapplied to the motors until after the master controller MC is returned to the "off" position since the actuating coil of the no-voltage relay NV is shunted, thereby causing this relay to remain open. The shunting circuit for the coil of the relay NV extends from the conductor 23 through either contact segment 55 or contact segment 56 on the controller MC, conductor 57, and contact members NV2. This shunting circuit may be interrupted by actuating the controller MC to the "off" position after which power may be applied to the motors M1 and M2 by operating the controller through the running positions in the manner hereinbefore described.

The switches LS1 and LS2 are so constructed that they are not operated by the devices 21 and 22 in a direction to energize the coil of the relay E when the locomotive is ascending the grade. Thus, power is maintained on the locomotive when it is ascending the grade. If it is desired to limit the speed of the locomotive when it is going around a curve in either direction the switches LS1 and LS2 may be so constructed that the dynamic braking circuits will be established when the locomotive is operating in either direction. In this manner the speed of the locomotive may be automatically limited when it is operating over any section of the track. The actuating devices 21 and 22 may be located at any desired points along the track.

In the modification of the invention shown in Figure 2, in which like parts are designated by the same reference characters as in Figure 1, dynamic braking is automatically applied whenever the locomotive exceeds a predetermined speed. The energization of the emergency relay E is automatically controlled by contact members OS1 of an overspeed device OS which is connected to the motor M2. The overspeed device OS may be operated by centrifugal force or in any other suitable manner. When the contact members OS1 are closed the actuating coil of the relay E is energized through a circuit which may be traced from positive through contact members OS1, conductor 58, a push button switch PB, conductor 59 and the coil of the switch E to ground. A holding circuit for the coil E is established through the contact members E3 upon the closing of these contact members.

The operation of the relay E effects the establishment of the dynamic braking circuits for the motors M1 and M2 in the manner hereinbefore described. Likewise, the resistor shunting switches R2, R4 and R6 are sequentially closed by the energization of their actuating coils through contact members E6, E7 and E8 on the relay E under the control of the current-limit relay 37 in the manner hereinbefore described. In the Fig. 2 system the relay E is provided with additional contact members E9, E10 and E11 which cause the switches R7, R8 and R10 to be closed in sequential relation in a manner similar to the closing of the switches R2, R4 and R6. In this manner the locomotive speed is reduced to a low value at which dynamic braking is no longer effective.

Before power can be reapplied to the motors the operator must stop the locomotive, get off and operate the push button PB which may be so located on the locomotive that it is impossible to operate the push button without the operator leaving his normal position. The opening of the push button switch PB interrupts the holding circuit for the relay E, thereby causing this relay to drop to its lowermost position which causes the disconnecting of the dynamic braking circuits and the opening of the resistor shunting switches.

In addition to operating the push button PB it is also necessary for the operator to return the master controller MC to the "off" position to permit the closing of the no-voltage relay in the manner hereinbefore described before power can be reapplied to the motors. After the no-voltage relay is closed the controller may be actuated through the running positions to reapply power to the locomotive in the manner hereinbefore described.

From the foregoing description it is apparent that we have provided safety features which automatically limit the speed of a locomotive independently of the operator and the normal control apparatus. The systems herein described may be readily applied to existing locomotives by the addition of a relatively small amount of apparatus.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In an electrically propelled vehicle, a motor-means, means for causing a variable voltage to be applicable across the terminals of the motor-means for speed-control during motoring, means for establishing a variable intensity of electric braking using said motor-means as a generator, a normal-operation controller-means for normally putting the motoring and electric-braking operations under the control of the vehicle-operator, a current-limit relay, an emergency switching-means having a normal position and an emergency position, emergency-switch actuating-means which is out of the control of the vehicle-operator for actuating said emergency switching-means from its normal position to its emergency position in response to some particular operating-condition of the vehicle, and means responsive to the emergency position of the emergency switching-means for taking the control away from said controller-means to the extent of discontinuing any motoring operation and automatically progressively establishing a number of steps of electric braking under the control of the current-limit relay, regardless of the position of the controller-means, said automatically established electric-braking steps, under emergency-switching control, being only certain of the weaker-intensity electric-braking steps, leaving the stronger-intensity electric-braking steps under the control of the controller-means.

2. In an electrically propelled vehicle, a motor-means, means for causing a variable voltage to be applicable across the terminals of the motor-means for speed-control during motoring, means for establishing a variable intensity of electric braking using said motor-means as a generator, a normal-operation controller-means for normally putting the motoring and electric-braking operations under the control of the vehicle-operator, a current-limit relay, an emergency switching-means having a normal position and an emergency position, emergency-switch actuating-means which is out of the control of the vehicle-operator for actuating said emergency switching-means from its normal position to its emergency position in response to some particular operating-condition of the vehicle, means responsive to the emergency position of the emergency switching-means for taking the control away from said controller-means to the extent of discontinuing any motoring operation and automatically progressively establishing a number of steps of electric braking under the control of the current-limit relay, regardless of the position of the controller-means, and means responsive to an actuation of the emergency switching-means to its emergency position for thereafter requiring that the controller-means be restored to its off-position before a resetting of the emergency switching-means will enable the controller-means to regain its normal control over the motoring and electric-braking operations.

3. The invention as defined in claim 2, in which the vehicle travels over a predetermined route, and in which a safety-means is associated with said emergency-switch actuating-means, said safety-means being adapted to cooperate with means at a predetermined point in the route of said vehicle to cause said emergency-switch actuating-means to actuate said emergency switching-means to its emergency position.

4. The invention as defined in claim 2, characterized by said emergency-switch actuating-means operating in response to a predetermined overspeed-condition of the vehicle, and further characterized by said automatically established electric-braking steps, under emergency-switching control, including all of the electric-braking steps, for automatically reducing the vehicle-speed to a low value at which electric braking is no longer effective.

5. The invention as defined in claim 3, in which a second safety-means is associated with said emergency-switch actuating-means, said second safety-means being adapted to cooperate with means at another predetermined point in the route of said vehicle to cause said emergency-switch actuating-means to restore said emergency switching-means to its normal position.

6. The invention as defined in claim 4, in combination with emergency-switch resetting means, under the control of the vehicle-operator but only from some position other than the operator's position at the normal-operation controller-means, for restoring said emergency switching-means from its emergency position to its normal position.

MAXWELL D. BRANE.
ALLEN McLANAHAN.

References Cited in the file of this patent
UNITED STATES PATENTS

| Number | Name | Date |
|---|---|---|
| 1,699,748 | North | Jan. 22, 1929 |
| 1,947,059 | Ponsonby | Feb. 13, 1934 |
| 2,121,605 | Mardis et al. | June 21, 1938 |
| 2,128,034 | Austin et al. | Aug. 23, 1938 |
| 2,183,409 | Schiebeler | Dec. 12, 1939 |
| 2,400,998 | Krapf | May 28, 1946 |
| 2,484,213 | Fitzgerald | Oct. 11, 1949 |